(12) United States Patent
Sakakibara

(10) Patent No.: US 8,539,998 B2
(45) Date of Patent: Sep. 24, 2013

(54) ANTI-SKID DEVICE FOR TIRES

(76) Inventor: Kouichi Sakakibara, Hashima (JP)

(*) Notice: Subject to any disclaimer, the term of this patent is extended or adjusted under 35 U.S.C. 154(b) by 0 days.

(21) Appl. No.: 13/700,896

(22) PCT Filed: Sep. 21, 2011

(86) PCT No.: PCT/JP2011/071434
§ 371 (c)(1),
(2), (4) Date: Nov. 29, 2012

(87) PCT Pub. No.: WO2012/124194
PCT Pub. Date: Sep. 20, 2012

(65) Prior Publication Data
US 2013/0118665 A1    May 16, 2013

(30) Foreign Application Priority Data

Mar. 17, 2011 (JP) ................. 2011-059688

(51) Int. Cl.
*B60C 27/04* (2006.01)
(52) U.S. Cl.
USPC ........ 152/217; 152/170; 152/216; 152/225 R; 152/219
(58) Field of Classification Search
USPC ............ 152/170, 178, 179, 185, 213 R, 216, 152/213 A, 217, 219, 225 R, 225 C
See application file for complete search history.

(56) References Cited

U.S. PATENT DOCUMENTS

| 1,020,489 | A | * | 3/1912 | Gaylor | 152/225 R |
| 3,762,456 | A | * | 10/1973 | Clouston | 152/213 A |
| 6,619,353 | B1 | * | 9/2003 | Kim | 152/225 R |
| 6,860,306 | B2 | * | 3/2005 | Sakakibara | 152/225 R |
| 7,096,905 | B2 | * | 8/2006 | Sakakibara | 152/225 R |
| 2003/0084976 | A1 | | 5/2003 | Sakakibara | |
| 2005/0146205 | A1 | | 7/2005 | Sakakibara | |
| 2006/0225254 | A1 | | 10/2006 | Fu | |
| 2007/0131325 | A1 | | 6/2007 | Sakakibara | |
| 2010/0252160 | A1 | | 10/2010 | Gelowicz et al. | |
| 2012/0279625 | A1 | | 11/2012 | Sakakibara | |

FOREIGN PATENT DOCUMENTS

| JP | U-52-139204 | 10/1977 |
| JP | U-63-138206 | 9/1988 |
| JP | U-01-157004 | 10/1989 |
| JP | U-02-054607 | 4/1990 |

(Continued)

OTHER PUBLICATIONS

International Search Report issued in International Application No. PCT/JP2011/071434 dated Jan. 10, 2012.

*Primary Examiner* — Kip T Kotter
(74) *Attorney, Agent, or Firm* — Oliff & Berridge, PLC

(57) ABSTRACT

In an anti-skid device in which anti-skid bodies are connected to be arranged in the circumferential direction of a tire of a car, connecting/separating workability is simplified. Connecting components are also simplified in their structure and production. Rod-like and tube-like connecting components are attached to the front-side and the rear-side of each anti-skid body. A manipulation member is configured such that an attaching rod and a connecting rod arranged in parallel with each other are connected by a manipulation rod, the attaching rod and the connecting rod are inserted into attaching holes and connecting holes of the tube-like connecting component, and the manipulation member is thus movable in the crossing direction of the tube-like connecting component. An elastic member is provided which applies a backward movement force to the manipulation member.

5 Claims, 6 Drawing Sheets

(56) References Cited

FOREIGN PATENT DOCUMENTS

| | | |
|---|---|---|
| JP | U-04-009305 | 1/1992 |
| JP | U-05-054002 | 7/1993 |
| JP | A-2000-289419 | 10/2000 |
| JP | A-2003-089307 | 3/2003 |
| JP | A-2003-252016 | 9/2003 |
| JP | A-2005-126069 | 5/2005 |
| JP | A-2007-290627 | 11/2007 |
| JP | A-2008-013051 | 1/2008 |
| JP | A-2008-110680 | 5/2008 |
| JP | A-2008-120226 | 5/2008 |
| JP | A-2008-137394 | 6/2008 |
| JP | A-2008-273455 | 11/2008 |
| JP | A-2008-308149 | 12/2008 |
| JP | A-2009-045973 | 3/2009 |
| JP | A-2009-120050 | 6/2009 |
| JP | A-2011-011671 | 1/2011 |
| JP | A-2011-063164 | 3/2011 |
| JP | A-2011-168233 | 9/2011 |
| JP | A-2011-189773 | 9/2011 |
| JP | A-2012-016963 | 1/2012 |
| JP | A-2012-040884 | 3/2012 |

\* cited by examiner

ANTI-SKID DEVICE FOR TIRES

TECHNICAL FIELD

The present invention relates to an anti-skid device to be attached to a tire for cars.

BACKGROUND ART

Patent literature (PTL below) discloses for example an anti-skid device in which anti-skid bodies having U-shaped cross-section are fitted therein with a tire of a car. Two or more anti-skid bodies are arranged in the circumferential direction of the tire so as to be connected with one another. The two or more anti-skid bodies are attached to the tire in a circular fashion. When the anti-skid device is to be detached from the tire, the anti-skid bodies are separated from one another thereby to be released from the tire.

Each of the anti-skid bodies having U-shaped cross-section has a crossing part crossing the ground contact surface of the tire, an exterior part located along the outside surface of the tire, and an interior part located along the inside surface of the tire.

Exterior parts of anti-skid bodies are attached thereto with respective connecting components at the front-side and the rear-side in the circumferential direction of the tire. When connecting the anti-skid bodies, the connecting component at the rear-side of each anti-skid body and the connecting component at the front-side of the next behind anti-skid body are connected with each other in a separable manner.

CITATION LIST

Patent Literature

[PTL 1]
Japanese Patent No. 3557464
[PTL 2]
Japanese Patent No. 3718779
[PTL 3]
Japanese Unexamined Patent Application Publication No. 2007-290627

SUMMARY OF INVENTION

Technical Problem

Problems

In such an anti-skid device for tires as described above, the workability is desired to be easy for connecting anti-skid bodies using connecting components. It is also desired that the workability is easy for separating the anti-skid bodies connected using the connecting components.

Connecting components are desired to be simplified in their structure and easily produced.

In addition, a tire for cars is reduced in its outer diameter due to abrasion of the ground contact surface during use. Replaced one thus has a larger outer diameter. Therefore, it is desired that an anti-skid device can be used if the outer diameter of a tire changes.

[Original Ideas]

1. Connecting components are made as being of plug-in type, such as by rods and tubes. Each connecting component is made to comprise a rod-like connecting component and a tube-like connecting component, and is designed such that the rod-like connecting component can be fitted into or inserted into the tube-like connecting component. This allows the connecting workability and the separating workability to be simplified. Moreover, the rod-like connecting component and the tube-like connecting component can easily be manufactured from a rod material and a tubular material, respectively. The structure is thus simplified.

The attaching end of the rod-like connecting component is attached to one of the front-side and the rear-side of each anti-skid body. The attaching end of the tube-like connecting component is attached to the other of the front-side and the rear-side of the anti-skid body. The rod-like connecting component is allowed to be inserted into a center hole of the tube-like connecting component from an end opening thereof.

The tube-like connecting component is attached thereto with a manipulation member. The manipulation member is configured such that an attaching rod and a connecting rod arranged in parallel with each other are connected by a manipulation rod, thus having a hook shape. The attaching rod is made to be longer than the connecting rod. The manipulation member can easily be manufactured by bending or folding one rod material or by connecting plural rod materials.

An attaching hole and a connecting hole are formed in the tube-like connecting component to pass therethrough in a crossing direction. The attaching hole and the connecting hole are respectively located at an attaching end side and a free end side of the tube-like connecting component.

The manipulation member is caused to be movable in the crossing direction of the tube-like connecting component by inserting the attaching rod into the attaching hole of the tube-like connecting component and inserting the connecting rod into the connecting hole of the tube-like connecting component. The manipulation member is configured such that, when the manipulation rod is caused to move forward away from the tube-like connecting component, the connecting rod is pulled out from the connecting hole of the tube-like connecting component. The manipulation member is also configured such that, when the manipulation rod is caused to move backward to come close the tube-like connecting component, the connecting rod is inserted into the connecting hole of the tube-like connecting component to cross the center hole of the tube-like connecting component. The attaching rod is configured to remain inserted in the attaching hole of the tube-like connecting component during both the forward movement and the backward movement. An elastic member is provided for applying a backward movement force to the manipulation member, A connecting hole is formed in the rod-like connecting component to pass therethrough in a crossing direction, When the rod-like connecting component and the tube-like connecting component are connected with each other, the manipulation member is caused to move forward against the elastic member such as by pulling the manipulation rod by hand, and the connecting rod is evacuated from the center hole of the tube-like connecting component. In a state where the connecting rod is evacuated, the rod-like connecting component is fitted into the center hole of the tube-like connecting component. The manipulation member is then caused to move backward by an elastic force of the elastic member, and the connecting rod is inserted into the connecting hole of the rod-like connecting component. This allows the rod-like connecting component and the tube-like connecting component to be connected with each other.

When the rod-like connecting component and the tube-like connecting component are separated from each other, the manipulation member is caused to move forward against the elastic member such as by pulling the manipulation rod by hand, and the connecting rod is pulled out from the connecting hole of the rod-like connecting component. In a state where the connecting rod is pulled out, the rod-like connecting component is pulled out from the tube-like connecting component. The rod-like connecting component and the tube-like connecting component are thus separated.

2. Connecting components are made as being adjustable in their connected total length. The rod-like connecting component is such that a plurality of connecting holes are arranged along the longitudinal direction with regular intervals or without regular intervals. If the connecting rod is inserted into a connecting hole located at the free end side of the rod-like connecting component, then the connected total length of the rod-like connecting component and the tube-like connecting component increases. If, on the other hand, the connecting rod is inserted into a connecting hole located at the attaching end side of the rod-like connecting component, then the connected total length of the rod-like connecting component and the tube-like connecting component decreases. A connecting hole to be inserted therein with the connecting rod is selected from the plurality of connecting holes thereby to allow for adjusting a connected total length of the rod-like connecting component and the tube-like connecting component, i.e. the space between neighboring anti-skid bodies.

A connecting hole to be inserted therein with the connecting rod is selected depending on the outer diameter or the outer circumferential length of the tire. The anti-skid device can thus be used even when the outer diameter of a tire changes.

3. The manipulation member is attached to the rod-like connecting component in place of the tube-like connecting component.

Solution to Problem

1. According to one aspect of the present invention, there is provided an anti-skid device for tires. The anti-skid device is configured such that two or more anti-skid bodies having a U-shaped cross-section are fitted therein with a tire of a car and arranged in circumferential direction of the tire so as to be connected with one another. Each of the anti-skid bodies has an exterior part along an outside surface of the tire. The exterior part is such that a front-side and a rear-side thereof in the circumferential direction of the tire are attached thereto with respective connecting components. A rear-side connecting component of each anti-skid body and a front-side connecting component of the next (next behind) anti-skid body are connected with each other in a separable manner.

The anti-skid device is characterized by features below.

Each of the connecting components comprises a rod-like connecting component and a tube-like connecting component. The rod-like connecting component has an attaching end to be attached to one of the front-side and the rear-side of the exterior part of each anti-skid body. The tube-like connecting component has an attaching end to be attached to the other of the front-side and the rear-side of the exterior part of each anti-skid body. The rod-like connecting component is allowed to be inserted into a center hole of the tube-like connecting component from an end opening thereof.

The tube-like connecting component is attached thereto with a manipulation member. The manipulation member is configured such that an attaching rod and a connecting rod arranged in parallel with each other are connected by a manipulation rod, thus having a hook shape.

An attaching hole and a connecting hole are formed in the tube-like connecting component to pass therethrough in a crossing direction. The attaching hole and the connecting hole are respectively located at an attaching end side and a free end side of the tube-like connecting component.

The manipulation member is movable in the crossing direction of the tube-like connecting component by inserting the attaching rod into the attaching hole of the tube-like connecting component and inserting the connecting rod into the connecting hole of the tube-like connecting component. The manipulation member is further configured such that, when the manipulation rod is caused to move forward away from the tube-like connecting component, the connecting rod is pulled out from the connecting hole of the tube-like connecting component while the attaching rod remains inserted in the attaching hole of the tube-like connecting component, and when the manipulation rod is caused to move backward to come close the tube-like connecting component, the connecting rod is inserted into the connecting hole of the tube-like connecting component to cross the center hole of the tube-like connecting component. An elastic member is provided for applying a backward movement force to the manipulation member.

A connecting hole is formed in the rod-like connecting component to pass therethrough in a crossing direction.

The anti-skid device is configured such that, when the rod-like connecting component and the tube-like connecting component are connected with each other, the manipulation member is caused to move forward against the elastic member, the connecting rod is evacuated from the center hole of the tube-like connecting component, the rod-like connecting component is fitted into the center hole of the tube-like connecting component, the manipulation member is caused to move backward by an elastic force of the elastic member, and the connecting rod is inserted into the connecting hole of the rod-like connecting component.

The anti-skid device is further configured such that, when the rod-like connecting component and the tube-like connecting component are separated from each other, the manipulation member is caused to move forward against the elastic member, the connecting rod is pulled out from the connecting hole of the rod-like connecting component, and the rod-like connecting component is pulled out from the tube-like connecting component.

2. The anti-skid device for tires of the above 1 may be characterized by the rod-like connecting component being such that a plurality of connecting holes are arranged along the longitudinal direction with intervals and a connecting hole to be inserted therein with the connecting rod is selected from the plurality of connecting holes thereby allowing a connected total length of the rod-like connecting component and the tube-like connecting component to be adjusted.

3. According to another aspect of the present invention, there is provided an anti-skid device for tires. The anti-skid device is configured such that two or more anti-skid bodies having a U-shaped cross-section are fitted therein with a tire of a car and arranged in circumferential direction of the tire so as to be connected with one another. Each of the anti-skid bodies has an exterior part along an outside surface of the tire.

The exterior part is such that a front-side and a rear-side thereof in the circumferential direction of the tire are attached thereto with respective connecting components. A rear-side connecting component of each anti-skid body and a front-side connecting component of the next (next behind) anti-skid body are connected with each other in a separable manner.

The anti-skid device is characterized by features below.

Each of the connecting components comprises a rod-like connecting component and a tube-like connecting component. The rod-like connecting component has an attaching end to be attached to one of the front-side and the rear-side of the exterior part of each anti-skid body. The tube-like connecting component has an attaching end to be attached to the other of the front-side and the rear-side of the exterior part of each anti-skid body. The rod-like connecting component is allowed to be inserted into a center hole of the tube-like connecting component from an end opening thereof.

The rod-like connecting component is attached thereto with a manipulation member. The manipulation member is configured such that an attaching rod and a connecting rod arranged in parallel with each other are connected by a manipulation rod, thus having a hook shape.

An attaching hole and a connecting hole are formed in the rod-like connecting component to pass therethrough in a crossing direction. The attaching hole and the connecting hole are respectively located at an attaching end side and a free end side of the rod-like connecting component.

The manipulation member is movable in the crossing direction of the rod-like connecting component by inserting the attaching rod into the attaching hole of the rod-like connecting component and inserting the connecting rod into the connecting hole of the rod-like connecting component. The manipulation member is further configured such that, when the manipulation rod is caused to move forward away from the rod-like connecting component, the connecting rod is pulled out from the connecting hole of the rod-like connecting component while the attaching rod remains inserted in the attaching hole of the rod-like connecting component, and when the manipulation rod is caused to move backward to come close the rod-like connecting component, the connecting rod is inserted into the connecting hole of the rod-like connecting component. An elastic member is provided for applying a backward movement force to the manipulation member.

A connecting hole is formed in the tube-like connecting component to pass therethrough in a crossing direction.

The anti-skid device is configured such that, when the rod-like connecting component and the tube-like connecting component are connected with each other, the manipulation member is caused to move forward against the elastic member, the connecting rod is pulled out from the connecting hole of the rod-like connecting component, the rod-like connecting component is fitted into the center hole of the tube-like connecting component, the manipulation member is caused to move backward by an elastic force of the elastic member, and the connecting rod is inserted into the connecting hole of the tube-like connecting component and the connecting hole of the rod-like connecting component.

The anti-skid device is further configured such that, when the rod-like connecting component and the tube-like connecting component are separated from each other, the manipulation member is caused to move forward against the elastic member, the connecting rod is pulled out from the connecting hole of the tube-like connecting component and the connecting hole of the rod-like connecting component, and the rod-like connecting component is pulled out from the tube-like connecting component.

4. The anti-skid device for tires of the above 3 may be characterized by the tube-like connecting component being such that a plurality of connecting holes are arranged along the longitudinal direction with intervals and a connecting hole to be inserted therein with the connecting rod is selected from the plurality of connecting holes thereby allowing a connected total length of the rod-like connecting component and the tube-like connecting component to be adjusted.

Advantageous Effects of Invention

The anti-skid device for tires is easy in connecting and separating anti-skid bodies. The connecting components are simplified in their structure and easily produced.

The anti-skid device for tires, when configured to be adjustable in the connected total length of the rod-like connecting component and the tube-like connecting component, can be used even if the outer diameter of a tire changes.

DESCRIPTION OF EMBODIMENTS

First Embodiment (Refer to FIG. 1 to FIG. 10)

Figure 1:
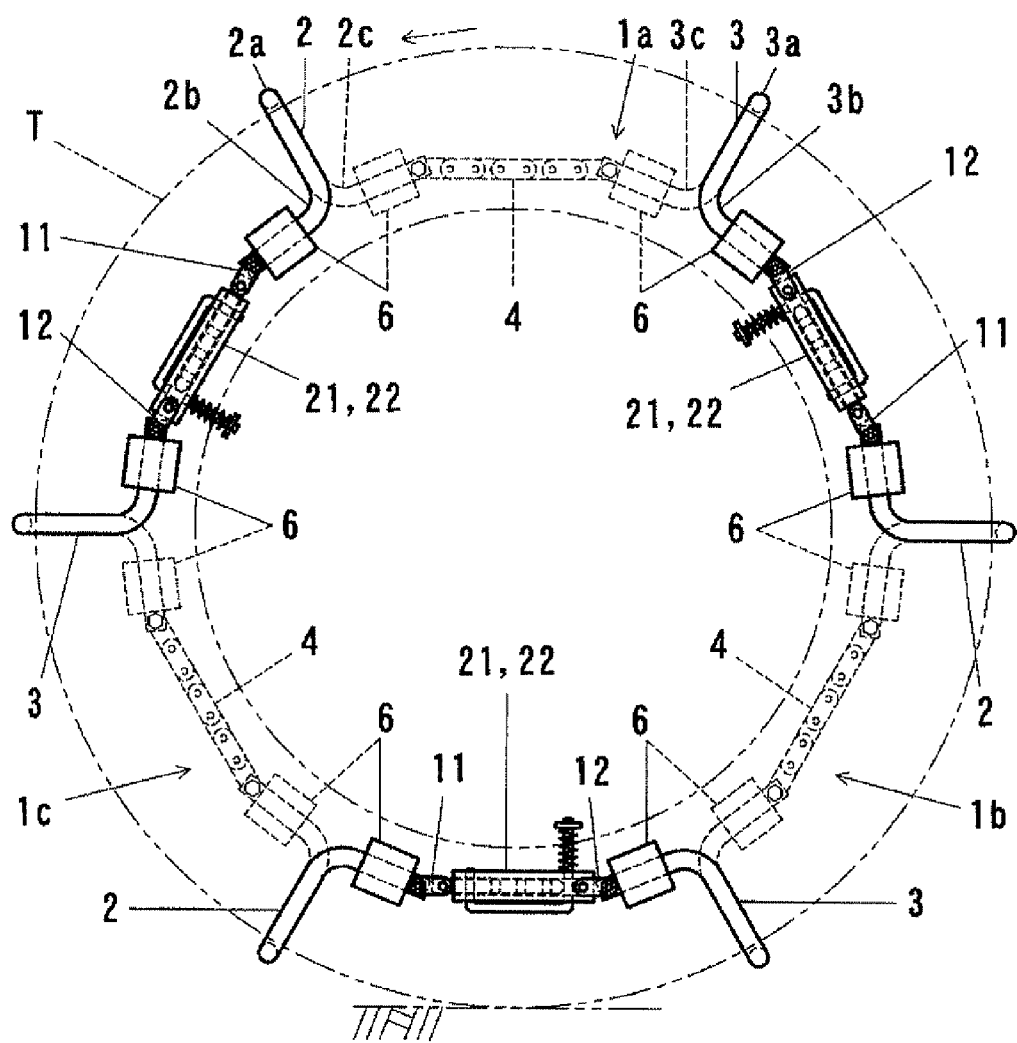
FIG. 1 is a front elevational view of a state where an anti-skid device for tires according to a first embodiment of the present invention is attached to a tire.

Referring to FIG. 1, a front elevational view of an anti-skid device for tires according to the present embodiment is shown where a state that the anti-skid device is attached to a tire T of a car is viewed from the exterior of the car. This anti-skid device is configured such that a first anti-skid body 1a, a second anti-skid body 1b and a third anti-skid body 1c (individually denoted herein, and collectively anti-skid body or bodies 1) are arranged to be connected with one another in a circumference direction of the tire T at regular intervals. Those three anti-skid bodies 1a, 1b, and 1c are of the same structure. Accordingly, the first anti-skid body 1a will representatively be described.

Figure 2:
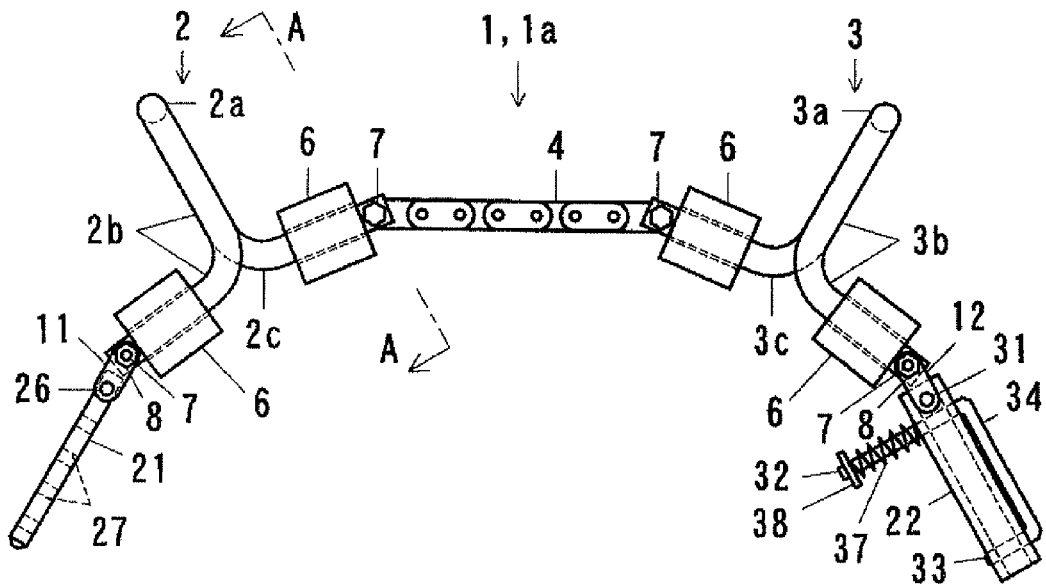
FIG. 2 is an enlarged front elevational view of a first anti-skid body shown in FIG. 1.
Figure 3:
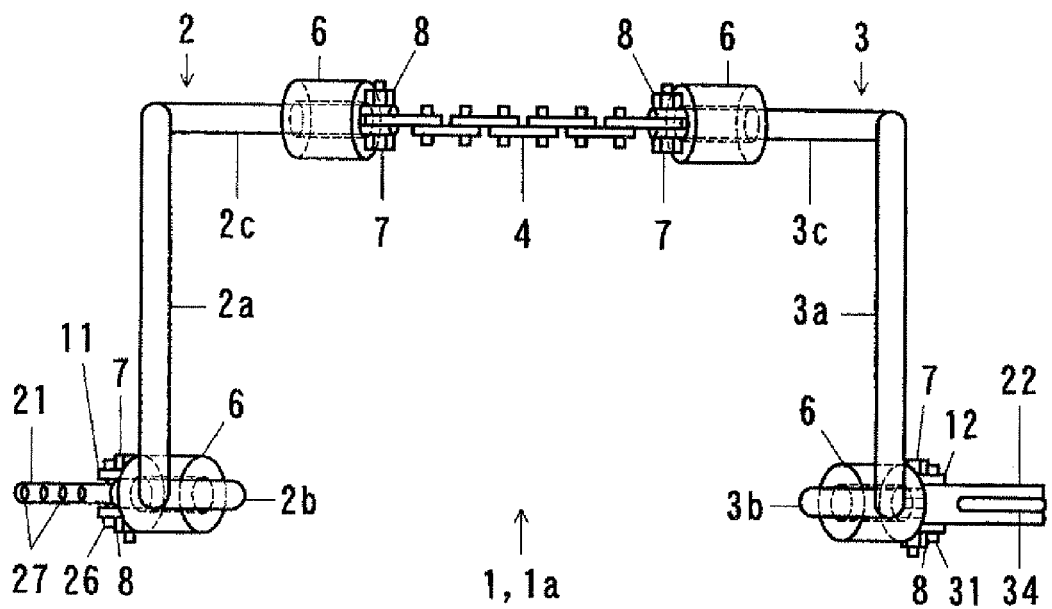
FIG. 3 is an enlarged plan view of the first anti-skid body.
Figure 4:
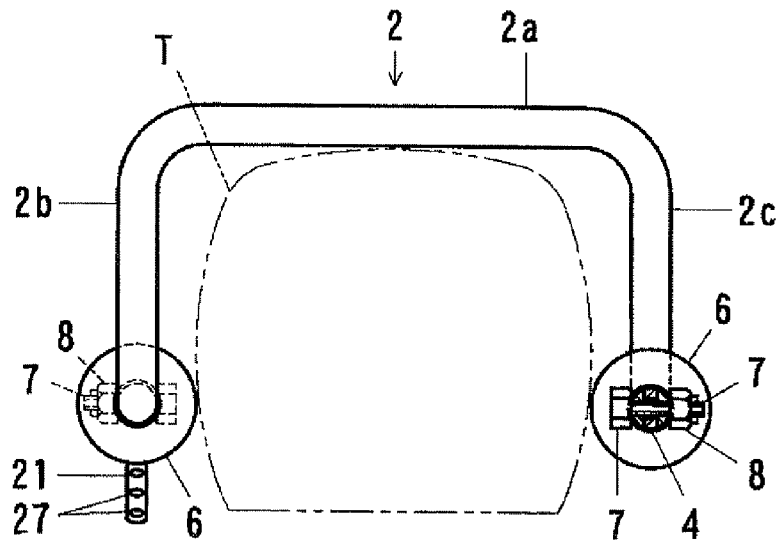
FIG. 4 is an enlarged cross-sectional view along line A-A in FIG. 2.

The first anti-skid body 1, 1a is shown in FIG. 2 and FIG. 3 with enlarged views each depicting a posture when attached to the upper portion of the tire T. FIG. 2 is a front elevational view when viewed from the exterior of the car. FIG. 3 is a plan view when viewed from the upper side. FIG. 4 is an enlarged cross-sectional view along line A-A in FIG. 2.

The first anti-skid body 1, 1a comprises a front-side U-shaped member 2, a rear-side U-shaped member 3, and an interior-side linear-shaped member 4 connecting therebetween. The "front-side" as used herein refers to a front side in the positive rotation direction of the tire T shown by arrow in FIG. 1, when the car moves forward, which represents the left side of the first anti-skid body 1a in FIG. 1, FIG. 2 and FIG. 3. The "rear-side" refers to a rear side in the positive rotation direction of the tire T, which represents the right side of the first anti-skid body 1a in FIG. 1, FIG. 2 and FIG. 3. The "interior-side" or "inside" refers to an interior side of the car, which is shown by broken lines in FIG. 1.

As shown in FIG. 1 to FIG. 3, the front-side and the rear-side U-shaped members 2 and 3 are formed in a spatially symmetrical structure in which round rods are curved into U shapes for being fitted therein with the outer circumference side of the tire T. The U-shaped members 2 and 3 have crossing parts 2a and 3a crossing the tread area (ground contact area) of the tire T, exterior parts 2b and 3b located along the outside surface of the tire T, and interior parts 2c and 3c located along the inside surface of the tire T. The front-side and the rear-side U-shaped members 2 and 3 are to be fitted therein with the tire T to make a center angle of about 60 degrees.

The front-side U-shaped member 2 is configured such that the exterior part 2b is mainly located along the radial direction of the tire T and an end portion of the exterior part 2b is bent and extends toward the front-side. The front-side extending portion of the exterior part 2b is located along the circumferential direction of the tire T. The front-side U-shaped member 2 is further configured such that the interior part 2c is mainly located along the radial direction of the tire T and an end portion of the interior part 2c is bent and extends toward the rear-side. The rear-side extending portion of the interior part 2c is also located along the circumferential direction of the tire T.

The rear-side U-shaped member 3 is configured such that the exterior part 3b is mainly located along the radial direction of the tire T and an end portion of the exterior part 3b is bent and extends toward the rear-side. The rear-side extending portion of the exterior part 3b is located along the circumferential direction of the tire T. The rear-side U-shaped member 3 is further configured such that the interior part 3c is mainly located along the radial direction of the tire T and an end portion of the interior part 3c is bent and extends toward the front-side. The front-side extending portion of the interior part 3c is also located along the circumferential direction of the tire T.

The interior-side linear-shaped member 4 is provided as a chain. This chain 4 comprises a plurality of plate-like links that are connected with one another by pins into a string-shape so as to be pivotally movable relative to one another. Thus, the interior-side linear-shaped member 4 is provided as a leaf chain.

As shown in FIG. 1 to FIG. 3, the front-side U-shaped member 2 is attached thereto with two contact members 6 each having a tubular shape so that one contact member 6 is inserted therein with the front-side extending portion of the exterior part 2b and the other contact member 6 is inserted therein with the rear-side extending portion of the interior part 2c. In addition, the rear-side U-shaped member 3 is also attached thereto with two contact members 6 each having a tubular shape so that one contact member 6 is inserted therein with the rear-side extending portion of the exterior part 3b and the other contact member 6 is inserted therein with the front-side extending portion of the interior part 3c. The tubular contact members 6 are arranged along the circumferential direction of the tire T. In the present embodiment, each contact member 6 is made of elastic material such as rubber, and has a hollow cylindrical shape. The outer peripheral surface of the outside contact member 6 is configured to contact with the outside surface of the tire T. The outer peripheral surface of the inside contact member 6 is configured to contact with the inside surface of the tire T. In addition, the outside contact member 6 and the inside contact member 6 are configured to contact with an inner area of the outside surface and an inner area of the inside surface, respectively, of the tire T. Each tubular contact member 6 may be, or may not be, rotatable around the axis thereof.

As shown in FIG. 3 and FIG. 4, the leading end of the interior-side linear-shaped member 4 is attached to the end of the interior part 2c of the front-side U-shaped member 2 using a bolt 7 and a nut 8. Similar to the leading end, the trailing end of the interior-side linear-shaped member 4 is attached to the end of the interior part 3c of the rear-side U-shaped member 3 using a bolt 7 and a nut 8. Bolts 7 are arranged along the axial direction of the tire T.

The leading end of the exterior part 2b of the front-side U-shaped member 2 is attached thereto with a front-side connecting member 11 using a bolt 7 and a nut 8. The trailing end of the exterior part 3b of the rear-side U-shaped member 3 is also attached thereto with a rear-side connecting member 12 using a bolt 7 and a nut 8. The front-side and the rear-side connecting members 11 and 12 are pivotally movable around respective bolts 7 that are provided along the axis direction of the tire T. The front-side and the rear-side connecting members 11 and 12 are thus provided as plate-like links of chains. The leading end of the front-side connecting member 11 is provided thereto with a rod-like connecting component 21. The trailing end of the rear-side connecting member 12 is provided thereto with a tube-like connecting component 22. The rod-like connecting component 21 and the tube-like connecting component 22 are made as capable of being connected with and separated from each other.

The anti-skid body 1 is configured to have a U-shaped cross-section for being fitted therein with the tire T. The anti-skid body 1 with the U-shaped cross-section is configured such that: the crossing parts 2a and 3a of the front-side and the rear-side U-shaped members 2 and 3 represent crossing parts which cross the ground contact surface of the tire T; the exterior parts 2b and 3b of the front-side and the rear-side U-shaped members 2 and 3 represent exterior parts which are arranged along the outside surface of the tire T; and the interior parts 2c and 3c of the front-side and the rear-side U-shaped members 2 and 3 and the interior-side linear-shaped member 4 represent interior parts which are arranged along the inside surface of the tire T. The respective exterior parts of the anti-skid body 1 are attached thereto with the rod-like connecting component 21 and the tube-like connecting component 22 via the front-side connecting member 11 and the rear-side connecting member 12 at the front-side and the rear-side of the anti-skid body 1, respectively, in the circumferential direction of the tire T.

Figure 5:
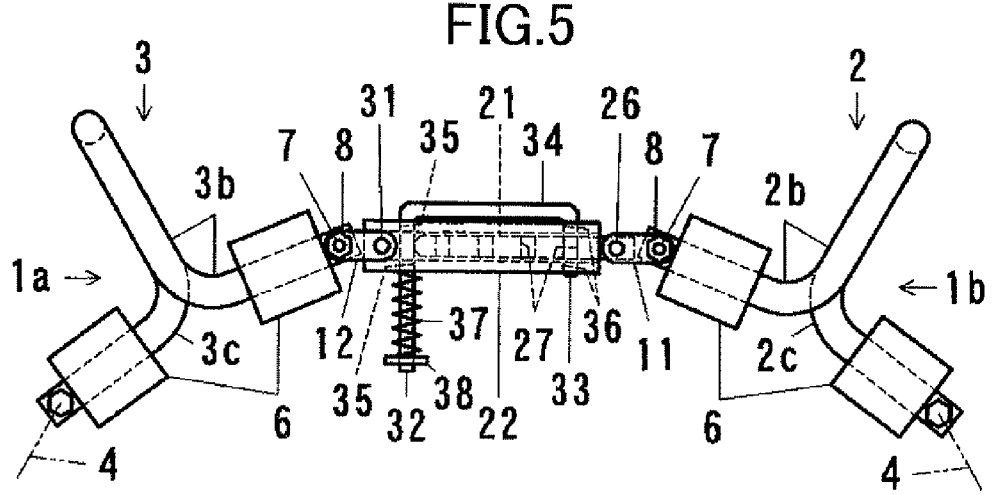
FIG. 5 is an enlarged front elevational view of a connecting portion between the first anti-skid body and a second anti-skid body in FIG. 1.
Figure 6:
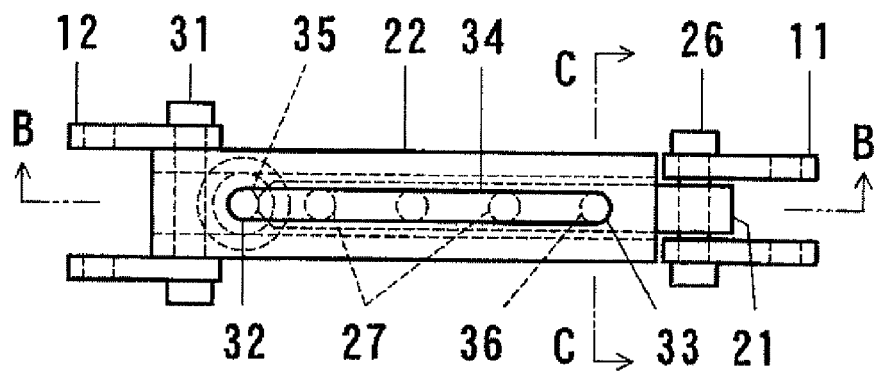
FIG. 6 is an enlarged plan view of the connecting portion.

In order to connect three anti-skid bodies 1a to 1c, three pairs of rod-like connecting components 21 and tube-like connecting components 22 are employed. The three pairs of connecting components 21 and 22 are of the same structure. FIG. 5 and FIG. 6 depict a state where a connecting portion between the first anti-skid body 1a and the second anti-skid body 1b in FIG. 1 is horizontally placed. The rod-like connecting component 21 and the tube-like connecting component 22 of the connecting portion will be described with reference to FIG. 5 to FIG. 10.

The rod-like connecting component 21 has a round rod shape and an attaching end thereof is attached to the leading end of the front-side connecting member 11 using a pin 26. The pin 26 is disposed along the axial direction of the tire T. The rod-like connecting component 21 is pivotally movable around the pin 26. Plural connecting holes 27 are formed in the rod-like connecting component 21 to pass therethrough in the radially crossing direction. The plural connecting holes 27 are arranged with regular intervals along the longitudinal direction of the rod-like connecting component 21. Each connecting hole 27 is provided substantially along the radial direction of the tire T.

The tube-like connecting component 22 has a hollow cylindrical shape and an attaching end thereof is attached to the trailing end of the rear-side connecting member 12 using a pin 31. The pin 31 is disposed along the axial direction of the tire T. The tube-like connecting component 22 is pivotally movable around the pin 31. The tube-like connecting component 22 has a center hole into which the rod-like connecting component 21 can be inserted from an opening of the end of the center hole.

A manipulation member is attached to the tube-like connecting component 22. The manipulation member is configured such that an attaching rod 32 and a connecting rod 33 arranged in parallel with each other are connected by a manipulation rod 34, thus having a hook shape. The attaching rod 32 is longer than the connecting rod 33. This manipulation member (32, 33, 34) is produced by folding a round rod.

A pair of attaching holes 35 and a pair of connecting holes 36 are formed in the tube-like connecting component 22 to pass therethrough in the crossing direction. The attaching holes 35 are located at the attaching end side of the tube-like connecting component 22, and the connecting holes 36 are located at the free end side of the tube-like connecting component 22. The attaching holes 35 and the connecting holes 36 are formed substantially along the radial direction of the tire T.

The manipulation member is set up so that the attaching rod 32 is inserted into the attaching holes 35 of the tube-like connecting component 22 and the connecting rod 33 is inserted into the connecting holes 36 of the tube-like connecting component 22. The manipulation rod 34 is parallel to the tube-like connecting component 22 and disposed at the opposite side to the center of the tire T. The manipulation member (32, 33, 34) is movable in the crossing direction of the tube-like connecting component 22. When the manipulation rod 34 is caused to move forward away from the tube-like connecting component 22, the connecting rod 33 is pulled out from the connecting holes 36 while the attaching rod 32 remains inserted in the attaching holes 35. When the manipulation rod 34 is caused to move backward to come close the tube-like connecting component 22, the connecting rod 33 is inserted into the connecting holes 36 to cross the center hole of the tube-like connecting component 22.

The attaching rod 32 is set up so that the end side portion thereof extends from the tube-like connecting component 22 toward the opposite side to the manipulation rod 34, i.e. toward the center of the tire T, and is inserted into a spiral spring 37, and a spring retainer 38 is in turn attached to the end of the attaching rod 32. The spiral spring 37 is interposed between the tube-like connecting component 22 and the spring retainer 38. The spiral spring 37 constitutes an elastic member for applying a backward movement force to the manipulation member (32, 33, 34).

Figure 7:
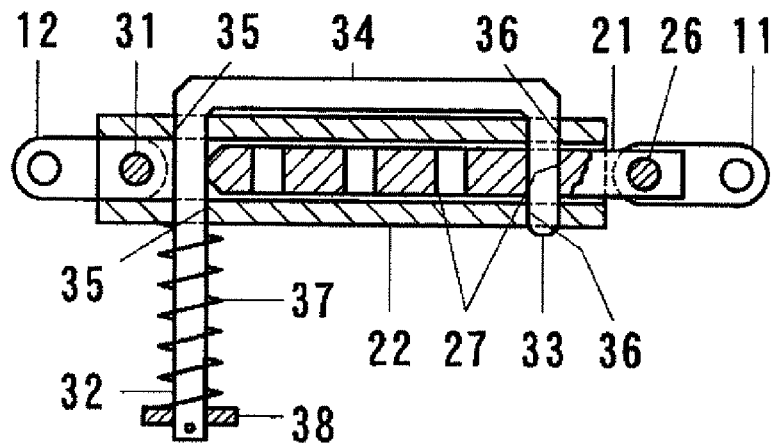
FIG. 7 is a cross-sectional view along line B-B in FIG. 6.
Figure 8:
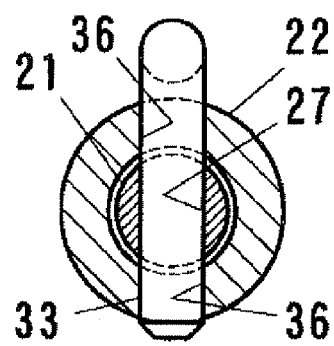
FIG. 8 is an enlarged cross-sectional view along line C-C in FIG. 6.
Figure 9:
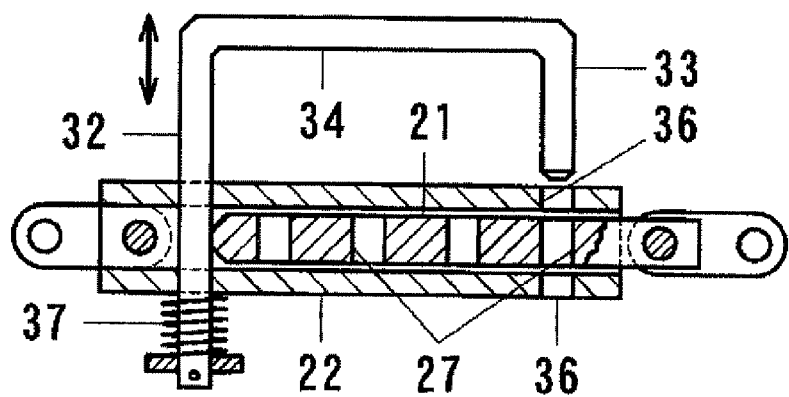
FIG. 9 is a cross-sectional view like FIG. 7 and illustrates a state where a manipulation member of connecting component of the connecting portion is caused to move forward so that a connecting rod is pulled out from connecting holes of a tube-like connecting component and a connecting hole of a rod-like connecting component.
Figure 10:
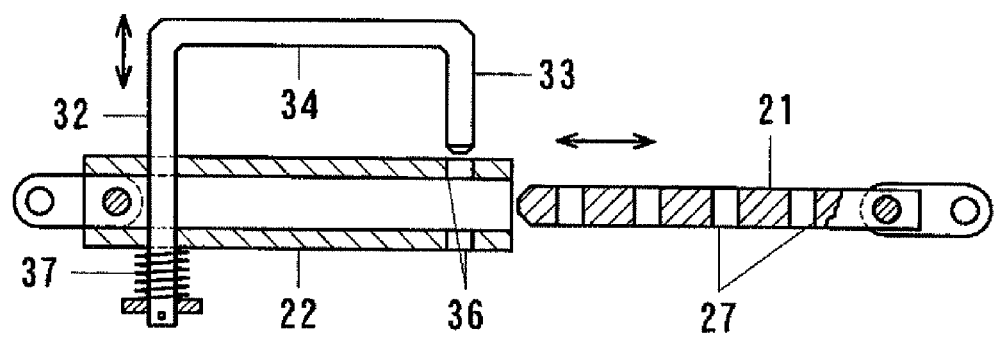
FIG. 10 is a cross-sectional view like FIG. 7 and illustrates a state where the manipulation member of the connecting component is caused to move forward so that the rod-like connecting component is pulled out from the tube-like connecting component.

When the rod-like connecting component 21 and the tube-like connecting component 22 are connected with each other, the manipulation member is caused to move forward against the spiral spring 37 as an elastic member by pulling the manipulation rod 34 using hand or pushing the end of the attaching rod 32. The connecting rod 33 is evacuated from the center hole of the tube-like connecting component 22, as shown in FIG. 10. In the evacuated state of the connecting rod 33, the rod-like connecting component 21 is fitted into the center hole of the tube-like connecting component 22, as shown in FIG. 9. The manipulation member is then caused to move backward by the elastic force of the elastic member 37. As shown in FIG. 7 and FIG. 8, the connecting rod 33 is inserted into the connecting holes 36 of the tube-like connecting component and one of the connecting holes 27 of the rod-like connecting component. This allows the rod-like connecting component 21 and the tube-like connecting component 22 to connect with each other.

If the connecting rod 33 is inserted into a connecting hole 27 located near the free end side of the rod-like connecting component 21 when the connecting rod 33 is inserted into one of the connecting holes 27 of the rod-like connecting component, then the connected total length of the rod-like connecting component 21 and the tube-like connecting component 22 becomes long. If, on the other hand, the connecting rod 33 is inserted into a connecting hole 27 located near the attaching end side of the rod-like connecting component 21, then the connected total length of the rod-like connecting component 21 and the tube-like connecting component 22 becomes short. The connecting hole 27 to be inserted therein with the connecting rod 33 is selected depending on the outer diameter or the outer circumferential length of the tire T.

When the rod-like connecting component 21 and the tube-like connecting component 22 are separated from each other, the manipulation member is caused to move forward against the elastic member 37 by pulling the manipulation rod 34 using hand or pushing the end of the attaching rod 32. The connecting rod 33 is pulled out from the connecting holes 36 of the tube-like connecting component and the connecting hole 27 of the rod-like connecting component, as shown in FIG. 9. The rod-like connecting component 21 is then pulled out from the tube-like connecting component 22, as shown in FIG. 10. This allows the rod-like connecting component 21 and the tube-like connecting component 22 to be separated from each other.

Figure 11:
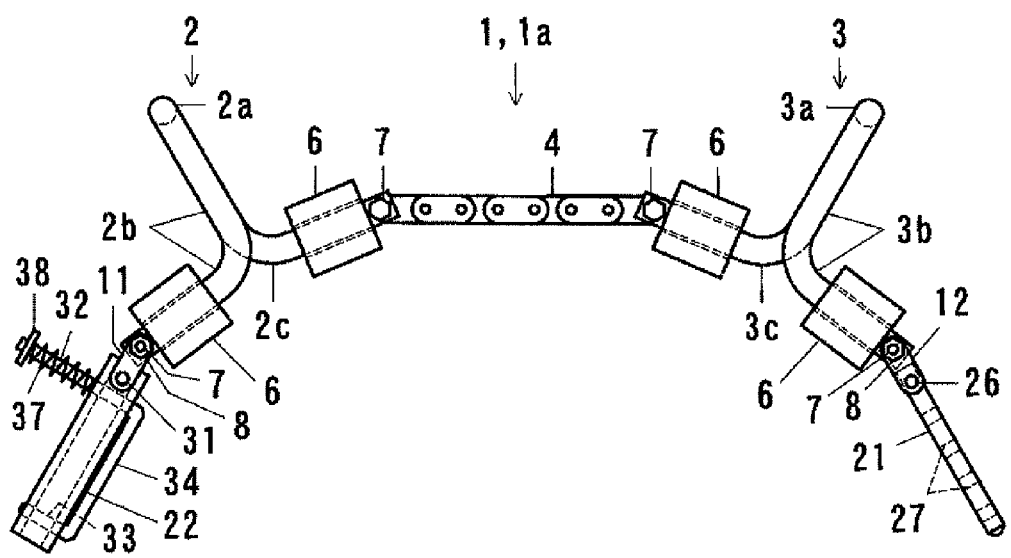
FIG. 11 is an enlarged front elevational view like FIG. 2 and illustrates a first anti-skid body of an anti-skid device according to a second embodiment.

Second Embodiment (Refer to FIG. 11)

An anti-skid device for tires according to the present embodiment is modified, as shown in FIG. 11, in the point that the connecting components 21 and 22 in the first embodiment are changed in their attaching positions and directions.

The attaching end of the rod-like connecting component 21 is attached to the trailing end of the exterior part 3b of the rear-side U-shaped member 3, i.e. the trailing end of the exterior part of the anti-skid body 1, via the rear-side connecting member 12. The attaching end of the tube-like connecting component 22 is attached to the leading end of the exterior part 2b of the front-side U-shaped member 2, i.e. the leading end of the exterior part of the anti-skid body 1, via the front-side connecting member 11. The manipulation member (32, 33, 34) is such that the manipulation rod 34 is located at the side of the center of the tire T. The spiral spring 37 and the spring retainer 38 are located at the opposite side to the center of the tire T. Centrifugal force acting on the manipulation member (32, 33, 34) due to the rotation of the tire T is directed such that the connecting rod 33 is further inserted into the connecting hole 27 of the rod-like connecting component 21.

Other features are similar to those in the first embodiment. In the drawing, similar components to those in the first embodiment are denoted by the same reference numerals or characters.

Figure 12:
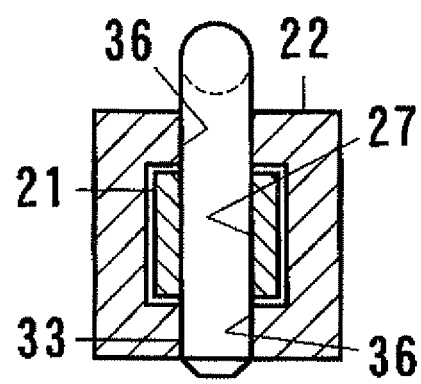
FIG. 12 is a cross-sectional view like FIG. 8 and illustrates connecting components of an anti-skid device according to a third embodiment.

Third Embodiment (Refer to FIG. 12)

An anti-skid device for tires according to the present embodiment is modified, as shown in FIG. 12, in the point that the connecting components 21 and 22 in the first embodiment are changed in their cross-sectional views.

The rod-like connecting component 21 has a square rod shape, and the cross-sectional view is square shaped. The tube-like connecting component 22 has a square tubular shape, and the cross-sectional view is square frame shape.

Other features are similar to those in the first embodiment. In the drawing, similar components to those in the first embodiment are denoted by the same reference numerals or characters.

Figure 13:
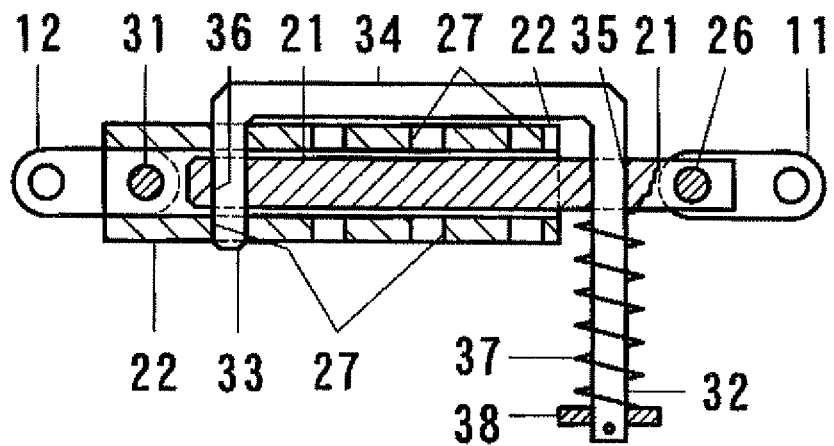
FIG. 13 is a cross-sectional view like FIG. 7 and illustrates connecting components of an anti-skid device according to a fourth embodiment.

Fourth Embodiment (Refer to FIG. 13)

An anti-skid device for tires according to the present embodiment is modified, as shown in FIG. 13, regarding connecting components compared to the connecting components 21 and 22 in the first embodiment for being attached thereto with the manipulation member (32, 33, 34).

The manipulation member (32, 33, 34) in the present embodiment is attached to the rod-like connecting component 21. An attaching hole 35 and a connecting hole 36 are formed in the rod-like connecting component 21 to pass therethrough in the crossing direction. The attaching hole 35 is located at the attaching end side of the rod-like connecting component 21, and the connecting hole 36 is located at the free end side of the rod-like connecting component 21.

The manipulation member is set up so that the attaching rod 32 is inserted into the attaching hole 35 of the rod-like connecting component 21 and the connecting rod 33 is inserted into the connecting hole 36 of the rod-like connecting component 21. The manipulation rod 34 is parallel to the rod-like connecting component 21. The manipulation member (32, 33, 34) is movable in the crossing direction of the rod-like connecting component 21. When the manipulation rod 34 is caused to move forward away from the rod-like connecting component 21, the connecting rod 33 is pulled out from the connecting hole 36 of the rod-like connecting component 21 while the attaching rod 32 remains inserted in the attaching hole 35 of the rod-like connecting component 21. When the manipulation rod 34 is caused to move backward to come close the rod-like connecting component 21, the connecting rod 33 is inserted into the connecting hole 36 of the rod-like connecting component 21.

The attaching rod 32 is set up so that the end side portion thereof extends from the rod-like connecting component 21 toward the opposite side to the manipulation rod 34 and is inserted into a spiral spring 37, and a spring retainer 38 is in turn attached to the end of the attaching rod 32. The spiral spring 37 is interposed between the rod-like connecting component 21 and the spring retainer 38. The spiral spring 37 constitutes an elastic member for applying a backward movement force to the manipulation member (32, 33, 34).

In the present embodiment, plural pairs of connecting holes 27 are formed in the tube-like connecting component 22 to pass therethrough in the radially crossing direction. The plural pairs of connecting holes 27 are arranged with regular intervals along the longitudinal direction of the tube-like connecting component 22.

When the rod-like connecting component 21 and the tube-like connecting component 22 are connected with each other, the manipulation member is caused to move forward against the spiral spring 37 as an elastic member by pulling the manipulation rod 34 using hand or pushing the end of the attaching rod 32. The connecting rod 33 is pulled out from the connecting hole 36 of the rod-like connecting component 21. In the evacuated state of the connecting rod 33, the rod-like connecting component 21 is fitted into the center hole of the tube-like connecting component 22. The manipulation member is then caused to move backward by the elastic force of the elastic member 37. The connecting rod 33 is inserted into one pair of the connecting holes 27 of the tube-like connecting component and the connecting hole 36 of the rod-like connecting component.

If the connecting rod 33 is inserted into a pair of connecting holes 27 located near the free end side of the tube-like connecting component 22 when the connecting rod 33 is inserted into one pair among the pairs of connecting holes 27 of the tube-like connecting component, then the connected total length of the rod-like connecting component 21 and the tube-like connecting component 22 becomes long. If, on the other hand, the connecting rod 33 is inserted into a pair of connecting holes 27 located near the attaching end side of the tube-like connecting component 22, then the connected total length of the rod-like connecting component 21 and the tube-like connecting component 22 becomes short. The pair of connecting holes 27 to be inserted therein with the connecting rod 33 is selected depending on the outer diameter or the outer circumferential length of the tire T.

When the rod-like connecting component 21 and the tube-like connecting component 22 are separated from each other, the manipulation member is caused to move forward against the elastic member 37 by pulling the manipulation rod 34 using hand or pushing the end of the attaching rod 32. The connecting rod 33 is pulled out from the connecting holes 27 of the tube-like connecting component and the connecting hole 36 of the rod-like connecting component. The rod-like connecting component 21 is then pulled out from the tube-like connecting component 22.

Other features are similar to those in the first embodiment. In the drawing, similar components to those in the first embodiment are denoted by the same reference numerals or characters.

Examples in Modification

1. While plural connecting holes 27 are arranged with regular intervals for the connecting component 21 or 22 in the above embodiments, they may be arranged with irregular intervals.

2. The plural connecting holes 27 in the above embodiments may be substituted by a single connecting hole.

3. While the spiral spring 37 is used as an elastic member for applying a backward movement force to the manipulation member (32, 33, 34) in the above embodiments, a volute spring or other appropriate springs may also be employed.

4. While a round rod is used as a rod that constitutes the manipulation member (32, 33, 34) in the above embodiments, a square rod may also be employed.

5. In the above embodiments, the rod-like connecting component 21 is attached to the exterior part 2b of the front-side U-shaped member 2 or the exterior part 3b of the rear-side U-shaped member 3 via the front-side connecting member 11 or the rear-side connecting member 12. Alternatively, the rod-like connecting component 21 may directly be connected by omitting the front-side connecting member 11 and/or the rear-side connecting member 12, if necessary, using the pin 26 to enable the pivotal movement thereof. Further, the pin 26 may also be omitted to integrate them. In addition, although the tube-like connecting component 22 is attached to the exterior part 3b of the rear-side U-shaped member 3 or the exterior part 2b of the front-side U-shaped member 2 via the rear-side connecting member 12 or the front-side connecting member 11, the front-side connecting member 11 and/or the rear-side connecting member 12 may be omitted so that the tube-like connecting component 22 can directly be connected, if necessary, using the pin 31 to enable the pivotal movement thereof. Further, the pin 31 may also be omitted to integrate them.

INDUSTRIAL APPLICABILITY

The anti-skid device for tires according to the present invention can be applied to the usage for various cars, such as small size, middle size, or large size passenger cars or motor trucks.

REFERENCE SIGNS LIST

T; tire for cars
1, 1a-1c; anti-skid body
1a; first anti-skid body
1b; second anti-skid body
1c; third anti-skid body
2; front-side U-shaped member
2a; crossing part
2b; exterior part
2c; interior part
3; rear-side U-shaped member
3a; crossing part
3b; exterior part
3c; interior part
4; interior-side linear-shaped member
2a, 3a; crossing part of anti-skid body
2b, 3b; exterior part of anti-skid body
2c, 3c, 4; interior part of anti-skid body
6; tubular contact member, outside contact member, inside contact member
7; bolt
8; nut
11; front-side connecting member
12; rear-side connecting member
21, 22; connecting component
21; rod-like connecting component
22; tube-like connecting component
26; pin
27; connecting hole
31; pin
32, 33, 34; manipulation member
32; attaching rod
33; connecting rod
34; manipulation rod
35; attaching hole
36; connecting hole
37; spiral spring, elastic member
38; spring retainer

The invention claimed is:
1. An anti-skid device for tires, configured such that two or more anti-skid bodies having a U-shaped cross-section are fitted therein with a tire of a car and arranged in circumferential direction of the tire so as to be connected with one another, the anti-skid bodies each having an exterior part along an outside surface of the tire, the exterior part being such that a front-side and a rear-side thereof in the circumferential direction of the tire are attached thereto with respective connecting components, a rear-side connecting component of each anti-skid body and a front-side connecting component of a respective next anti-skid body being connected with each other in a separable manner, the anti-skid device wherein the anti-skid bodies each comprising a front-side U-shaped member and a rear-side U-shaped member, the front-side U-shaped member having a front-side extending portion configured such that an end portion of the exterior part located along the radial direction of the tire is bent and extends toward the front-side along the circumferential direction of the tire, the rear-side U-shaped member having a rear-side extending portion configured such that an end portion of the exterior part located along the radial direction of the tire is bent and extends toward the rear-side along the circumferential direction of the tire, the connecting components each comprising a rod-like connecting component and a tube-like connecting component, the rod-like connecting component having an attaching end to be attached to one of the front-side of the front-side extending portion and the rear-side of the rear-side extending portion of each anti-skid body, the tube-like connecting component having an attaching end to be attached to other of the front-side of the front-side extending portion and the rear-side of the rear-side extending portion of each anti-skid body, the rod-like connecting component being allowed to be inserted into a center hole of the tube-like connecting component from an end opening thereof, the tube-like connecting component being attached thereto with a manipulation member, the manipulation member being configured such that an attaching rod and a connecting rod arranged in parallel with each other are connected by a manipulation rod, thus having a hook shape, an attaching hole and a connecting hole being formed in the tube-like connecting component to pass therethrough in a crossing direction, the attaching hole and the connecting hole being respectively located at an attaching end side and a free end side of the tube-like connecting component, the manipulation member being movable in the crossing direction of the tube-like connecting component by inserting the attaching rod into the attaching hole of the tube-like connecting component and inserting the connecting rod into the connecting hole of the tube-like connecting component, the manipulation member being further configured such that, when the manipulation rod is caused to move forward away from the tube-like connecting component, the connecting rod is pulled out from the connecting hole of the tube-like connecting component while the attaching rod remains inserted in the attaching hole of the tube-like connecting component, and when the manipulation rod is caused to move backward to come close the tube-like connecting component, the connecting rod is inserted into the connecting hole of the tube-like connecting component to cross the center hole of the tube-like connecting component, an elastic member being provided for applying a backward movement force to the manipulation member, a connecting hole being formed in the rod-like connecting component to pass therethrough in a crossing direction, the anti-skid device being configured such that, when the rod-like connecting component and the tube-like connecting component are connected with each other, the manipulation member is caused to move forward against the elastic member, the connecting rod is evacuated from the center hole of the tube-like connecting component, the rod-like connecting component is fitted into the center hole of the tube-like connecting component, the manipulation member is caused to move backward by an elastic force of the elastic member, and the connecting rod is inserted into the connecting hole of the rod-like connecting component, and the anti-skid device being further configured such that, when the rod-like connecting component and the tube-like connecting component are separated from each other, the manipulation member is caused to move forward against the elastic member, the connecting rod is pulled out from the connecting hole of the rod-like connecting component, and the rod-like connecting component is pulled out from the tube-like connecting component.

2. The anti-skid device for tires as set forth in claim 1, wherein the rod-like connecting component being such that a plurality of connecting holes are arranged along a longitudinal direction with intervals and a connecting hole to be inserted therein with the connecting rod is selected from the plurality of connecting holes thereby allowing a connected total length of the rod-like connecting component and the tube-like connecting component to be adjusted.

3. The anti-skid device for tires as set forth in claim 1, wherein the front-side U-shaped member has a rear-side extending portion configured such that an end portion of an interior part located along the radial direction of the tire is bent and extends toward the rear-side along the circumferential direction of the tire, the rear-side U-shaped member has a front-side extending portion configured such that an end portion of an interior part located along the radial direction of the tire is bent and extends toward the front-side along the circumferential direction of the tire, the rear-side extending portion and the front-side extending portion of the interior-parts are connected by a linear-shaped member.

4. An anti-skid device for tires, configured such that two or more anti-skid bodies having a U-shaped cross-section are fitted therein with a tire of a car and arranged in circumferential direction of the tire so as to be connected with one another, the anti-skid bodies each having an exterior part along an outside surface of the tire, the exterior part being such that a front-side and a rear-side thereof in the circumferential direction of the tire are attached thereto with respective connecting components, a rear-side connecting component of each anti-skid body and a front-side connecting component of a respective next anti-skid body being connected with each other in a separable manner, the anti-skid device wherein the anti-skid bodies each comprising a front-side U-shaped member and a rear-side U-shaped member, the front-side U-shaped member having a front-side extending portion configured such that an end portion of the exterior part located along the radial direction of the tire is bent and extends toward the front-side along the circumferential direction of the tire, the rear-side U-shaped member having a rear-side extending portion configured such that an end portion of the exterior part located along the radial direction of the tire is bent and extends toward the rear-side along the circumferential direction of the tire, the connecting components each comprising a rod-like connecting component and a tube-like connecting component, the rod-like connecting component having an attaching end to be attached to one of the front-side of the front-side extending portion and the rear-side of the rear-side extending portion of each anti-skid body, the tube-like connecting component having an attaching end to be attached to other of the front-side of the front-side extending portion and the rear-side of the rear-side extending portion of each anti-skid body, the rod-like connecting component being allowed to be inserted into a center hole of the tube-like connecting component from an end opening thereof, the rod-like connecting component being attached thereto with a manipulation member, the manipulation member being configured such that an attaching rod and a connecting rod arranged in parallel with each other are connected by a manipulation rod, thus having a hook shape, an attaching hole and a connecting hole being formed in the rod-like connecting component to pass therethrough in a crossing direction, the attaching hole and the connecting hole being respectively located at an attaching end side and a free end side of the rod-like connecting component, the manipulation member being movable in the crossing direction of the rod-like connecting component by inserting the attaching rod into the attaching hole of the rod-like connecting component and inserting the connecting rod into the connecting hole of the rod-like connecting component, the manipulation member being further configured such that, when the manipulation rod is caused to move forward away from the rod-like connecting component, the connecting rod is pulled out from the connecting hole of the rod-like connecting component while the attaching rod remains inserted in the attaching hole of the rod-like connecting component, and when the manipulation rod is caused to move backward to come close the rod-like connecting component, the connecting rod is inserted into the connecting hole of the rod-like connecting component, an elastic member being provided for applying a backward movement force to the manipulation member, a connecting hole being formed in the tube-like connecting component to pass therethrough in a crossing direction, the anti-skid device being configured such that, when the rod-like connecting component and the tube-like connecting component are connected with each other, the manipulation member is caused to move forward against the elastic member, the connecting rod is pulled out from the connecting hole of the rod-like connecting component, the rod-like connecting component is fitted into the center hole of the tube-like connecting component, the manipulation member is caused to move backward by an elastic force of the elastic member, and the connecting rod is inserted into the connecting hole of the tube-like connecting component and the connecting hole of the rod-like connecting component, and the anti-skid device being further configured such that, when the rod-like connecting component and the tube-like connecting component are separated from each other, the manipulation member is caused to move forward against the elastic member, the connecting rod is pulled out from the connecting hole of the tube-like connecting component and the connecting hole of the rod-like connecting component, and the rod-like connecting component is pulled out from the tube-like connecting component.

5. The anti-skid device for tires as set forth in claim 4, wherein the tube-like connecting component being such that a plurality of connecting holes are arranged along a longitudinal direction with intervals and a connecting hole to be inserted therein with the connecting rod is selected from the plurality of connecting holes thereby allowing a connected total length of the rod-like connecting component and the tube-like connecting component to be adjusted.

* * * * *